United States Patent
Moody

(10) Patent No.: US 7,356,129 B1
(45) Date of Patent: Apr. 8, 2008

(54) APPARATUS FOR LOCATING A STATION INITIATING TRANSMISSION OF AN EMERGENCY MESSAGE IN A NETWORK HAVING MULTIPLE TRANSMISSION SOURCES

(76) Inventor: Martin D. Moody, 9641 Rich Valley Blvd., Inver Grove Heights, MN (US) 55077

(*) Notice: Subject to any disclaimer, the term of this patent is extended or adjusted under 35 U.S.C. 154(b) by 0 days.

(21) Appl. No.: 09/376,876

(22) Filed: Aug. 18, 1999

(51) Int. Cl.
*H04M 11/06* (2006.01)

(52) U.S. Cl. .............................. 379/45; 379/37; 379/51

(58) Field of Classification Search .................. 379/37, 379/40–45, 51, 49; 342/450, 457; 340/825.36, 340/825.49, 10.1, 825.46; 455/404, 456–457, 455/404.01, 456.1
See application file for complete search history.

(56) References Cited

U.S. PATENT DOCUMENTS

| | | | | |
|---|---|---|---|---|
| 4,839,917 A | * | 6/1989 | Oliver ........................ | 379/45 |
| 5,077,788 A | * | 12/1991 | Cook et al. ............ | 379/142.06 |
| 5,109,399 A | * | 4/1992 | Thompson ................... | 379/45 |
| 5,161,180 A | * | 11/1992 | Chavous ..................... | 379/45 |
| 5,235,630 A | | 8/1993 | Moody et al. ................ | 379/37 |
| 5,339,351 A | * | 8/1994 | Hoskinson et al. ........... | 379/45 |
| 5,343,509 A | * | 8/1994 | Dounies ..................... | 379/40 |
| 5,347,567 A | | 9/1994 | Moody et al. ................ | 379/45 |
| 5,347,568 A | | 9/1994 | Moody et al. ................ | 379/45 |
| 5,835,907 A | * | 11/1998 | Newman ..................... | 707/10 |
| 6,104,784 A | * | 8/2000 | Robbins ..................... | 379/45 |
| 6,151,385 A | * | 11/2000 | Reich et al. ................. | 379/49 |
| 6,266,397 B1 | * | 7/2001 | Stoner ........................ | 379/45 |
| 6,363,138 B1 | * | 3/2002 | Aprile ........................ | 379/45 |

OTHER PUBLICATIONS

"Cry for Help on the Internet", by Malcolm McConnell; *Reader's Digest*, Mar. 1998, p. 192-198.

* cited by examiner

*Primary Examiner*—Melur Ramakrishnaiah
(74) *Attorney, Agent, or Firm*—Nawrocki, Rooney & Sivertson, P.A.

(57) ABSTRACT

A system for identifying the location of an individual at a transmission source who has initiated a message relating to an emergency. The system includes means for determining the specific location of the message initiator.

5 Claims, 4 Drawing Sheets

APPARATUS FOR LOCATING A STATION INITIATING TRANSMISSION OF AN EMERGENCY MESSAGE IN A NETWORK HAVING MULTIPLE TRANSMISSION SOURCES

TECHNICAL FIELD

The present invention deals broadly with the field of communications. More specifically, however it deals with the initiation of an emergency message and the determination of the location of a specific source of the emergency message so initiated. The specific focus of the invention is the determination of the precise location of a transmission source in a network having multiple transmission sources which has transmitted indicia defining the precise location, such as the floor and the specific location on the floor of a large multistory building or complex.

BACKGROUND OF THE INVENTION

The Internet system, for example, which now encompasses virtually the entire world with a network, provides means to communicate in a variety of ways including print, audio and video. In the past long distance communications between individuals was dominated by the telephone and its interconnecting networks. Today this role is being rapidly supplanted by communications over the Internet utilizing a variety of paths and apparatus.

A problem presented by communication of widely disbursed instruments is that of responding quickly and appropriately to an emergency. In the past, the United States has utilized the "9-1-1" emergency call system. The goal of this system was to provide means for identifying the location of any instrument which initiated an emergency call. This system responded to the possibility of providing this information even if the person initiating the call was incapable, for any reason, either of providing the location information or of remaining on the line long enough to provide this information. The location system correlated the calling telephone number, which could be determined readily by the system, with the physical location of the telephone prestored in a data base.

Problems arose when the telephone was moved without a corresponding change in the data base, or when the telephone was accessed through a private branch exchange (PBX) system, or an equivalent. In many instances, structures such as PBX's or their equivalent access a large number of telephones through a single common telephone number.

The location system was improved by the disclosure of U.S. Pat. No. 5,347,567 (Moody et al.), which identified a specific station by providing unique indicia for each station. This unique indicia was converted to an electronic format by apparatus at the telephone which, when polled by the system, transmitted the data to the system.

These systems are all directed to relatively simple, essentially hard-wired systems which access the network using known protocol for both the communication and the 9-1-1 systems.

The necessity of determining the location of a calling station using, for example, the Internet is at least as critical, and in some cases may be more critical, than determining the location of a telephone in a conventional telephone system. An article in the March 1998 issue of READER'S DIGEST, entitled, "Cry for Help on the Internet", dramatically illustrates this problem. In the article, a 20-year old female student working late into the night at a college library in Kerave near Helsinki, Finland became violently ill. She was alone in the library and because of her illness was unable to move from her chair, consequently her only access to the outside world was via the Internet. She logged into a chat room in the Internet and explained her plight. A seven year old boy in Denton, Tex., who was just about to log off the Internet, noticed the message. Initially he felt that it was a hoax, but, as the messages continued and after he obtained the location of the sender, he became convinced that the message was legitimate. The boy had his parents call the sheriff's office, who in turn contacted authorities in the city of Kerave to rescue the Finnish student. This story illustrates that an emergency response system similar to that provided by the 9-1-1 system is also needed for the Internet and in other multiple transmission source networks. It also illustrates, because of the different systems involved and geographic distances, that such a system would be much more complex and different in nature that any existing telephone communication type emergency system.

On the Internet, unlike the conventional telephone system, each telephone may be connected to the Internet through a variety of different equipments with different routing connections and protocols, making it impractical to use previous polling methods to obtain stored location indicia at the telephone.

It is to this problem of an emergency response that the present invention is directed. It is a system for interpreting data transmitted by a remote station through a multiple transmission source network and determining the exact physical location of the initiator.

SUMMARY OF THE INVENTION

The present invention includes a method and emergency message processor (EMP) installed to interpret data to identify an initiator's location from a transmission sent from a transmission source in a network such as the Internet. The message is initiated by minimal volitional effort transmitting predetermined indicia, such as by closing a switch to a special circuit disposed so as to transmit the predetermined indicia.

The EMP is configured to respond to a specific predetermined code, which is unique for each individual initiator connected to the network, whether the transmission source is connected through a personal computer, a PBX, a computer in combination with a PBX, or other transmission source.

The unique code transmitted is used by the EMP to enter its data base which contains data correlating the exact location of every source with a unique code. This arrangement eliminates polling requirements of the prior art. Because of the variety of arrangements, protocols and addresses, that polling approach is impractical. The present invention is thus apparatus for locating a specific initiator which has transmitted a unique code over the network.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE INVENTION

Figure 1:
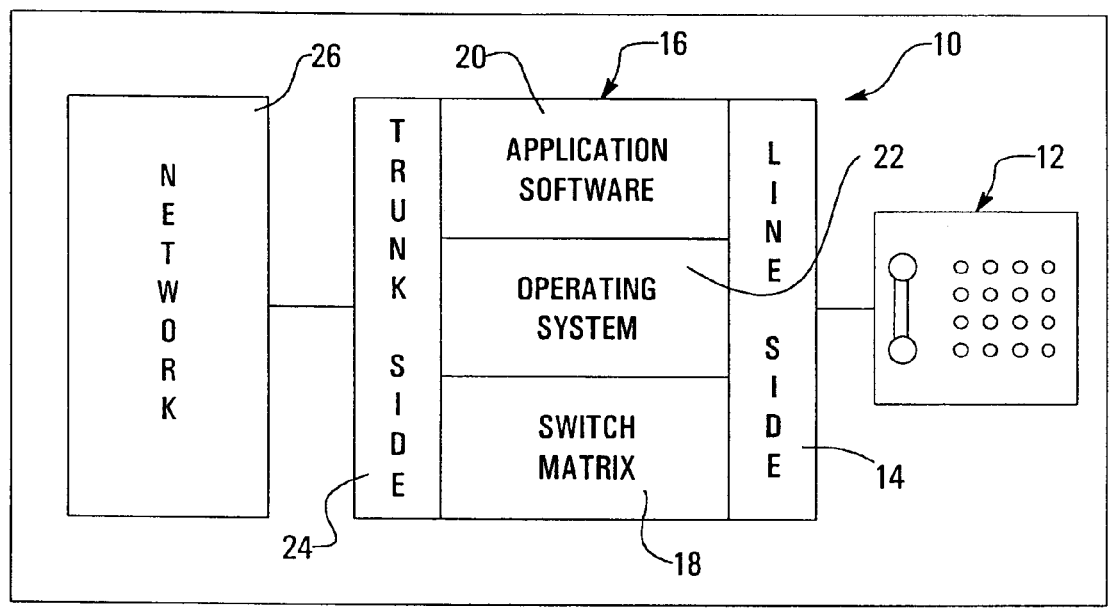
FIG. 1 is a block diagram of a conventional prior art PBX connection between a telephone and network.

Referring now to the drawings, wherein like reference numerals denote like elements throughout the several views, FIG. 1 illustrates a telephony circuit 10 as known in the prior art. That figure illustrates a transmission point 12 such as a conventional telephone set that, for example, might be on an individual's desk at a particular facility. The transmission point 12 is on the line side 14 of a PBX 16 of a type characteristic in the prior art. The PBX 16 is made is made up of various hardware and software elements to effect switching. The PBX employs an operating system 22 to run the overall PBX apparatus 16. Other hardware/software elements that might be employed by a PBX 16 are a switch matrix 18 and application software modules 20. The application software 20 serves to implement special features of the PBX 16 that the owner or administrator has elected.

A side of the PBX 16 opposite that on which the telephone set 12 is located is known as the trunk side 24 of the PBX 16. Interface hardware (not shown) is typically provided on the line side of the PBX 16 to connect the telephone set 12, or other transmission point, through the switch matrix 18 to the network 26.

Figure 2:
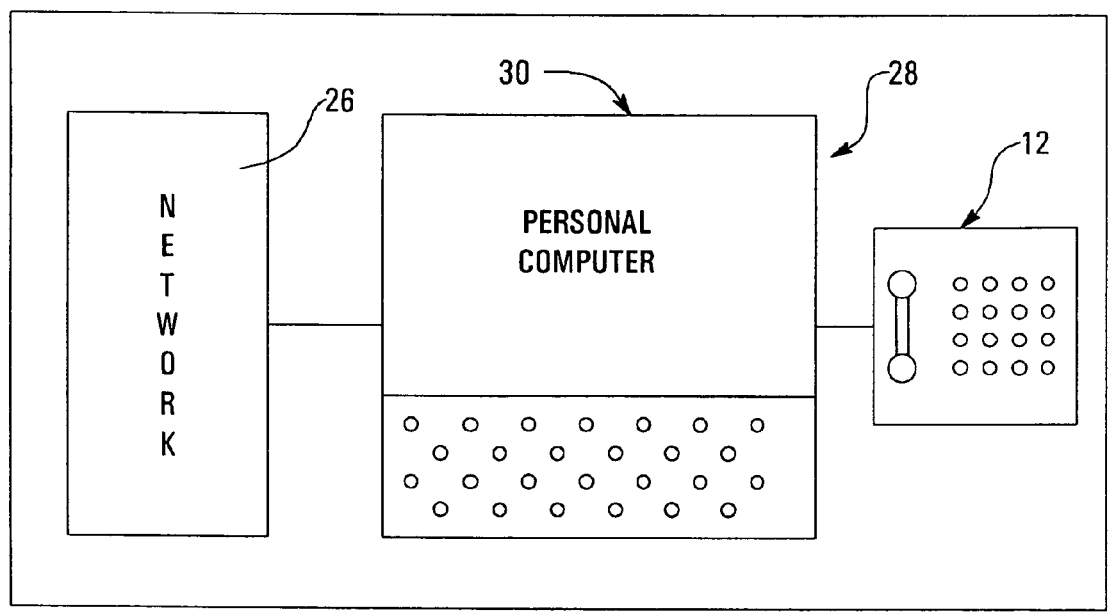
FIG. 2 is a block diagram of a first party phone connected to a network through a Computer Telephony Interface (CTI)

FIG. 2 is similar to FIG. 1 and is illustrative of a variation known in the prior art. That figure shows a system 28 where the functionality of the PBX 16 is performed by a personal computer 30, for example. Because the evolution of PBX's has developed such that they are more software oriented and less hardware oriented, a personal computer 30 can utilize software so as to enable a telephone set 12 to be connected to a network 26 through the computer 30. In such a variation, the computer 30 appears to be a PBX and performs the functions of a PBX.

It will be understood that, when a computer 30 is interposed in a system in place of a PBX 16, it employs similar software elements that enable it to mimic a PBX. It employs an operating system and application software, in addition to switch matrix functionality.

Figure 3:
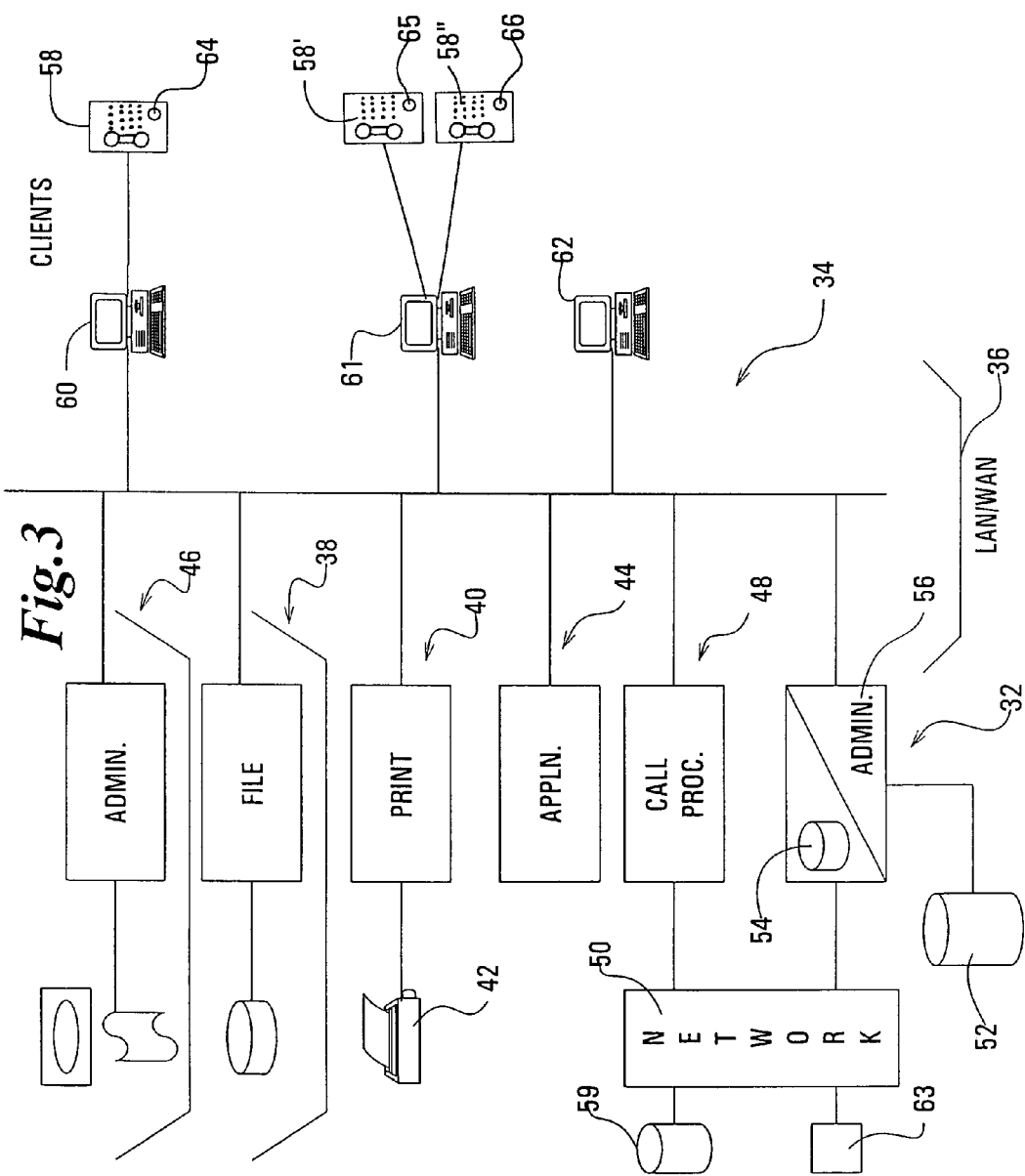
FIG. 3 is a block diagram of client connections through CTI's including server connections interconnected to a network through a call processor and an Emergency Message Processor (EMP)

FIG. 3 illustrates an emergency message processor 32 in accordance with the present invention as used in a telephony communications network 34. The emergency message processor, or "EMP" 32, is part of a local area network/WAN interface 36 for a computer telephony application. The interface 36 includes a file server 38 which stores various files. Also included in the interface 36 is a print server 40 which drives a print head or printer 42. Further, the interface 36 includes an applications component 44 for servicing of various applications such as voice mail or e-mail.

The interface 36 is also shown as including an administrative function component 46 and a call processing component 48. Such a component represents the typical connection to the network in which the EMP 32 functions. The call processing component 48 serves as a typical connection to the network 50 and serves to route both incoming and outgoing calls.

The local area network/WAN interface 36 cooperates with a first database 52 which provides various information with respect to possibly many transmission points capable of initiating an emergency telephone call.

FIG. 3 also shows as part of the interface 36 the EMP 32 in accordance with the present invention. The EMP 32 incorporates a data storage unit 54, or database, to which information can be communicated from the first database 52. The EMP 32 is also shown as including an administration component 56 for administering the overall computer telephony interface system 34.

FIG. 3 also illustrates a plurality of transmission stations or telephone sets 58, 58', 58". That figure illustrates a first handset 58 which interfaces with the interface 36 through a computer console 60. That handset 58 is shown as having an initiator button 64 which can be pressed to initiate the transmission of pre-designated emergency message. It will be understood, however, that initiation could be actuated in ways other than through a button on the handset.

FIG. 3 shows a second personal computer 61 through which a pair of handsets 58', 58" interface with the interface 36. These telephone handsets 58', 58", again, also have a representation of respective initiator buttons 65, 66 for indicating the occurrence of an emergency situation. Again, specific buttons illustrated are not the only way in which an emergency situation can be recorded.

FIG. 3 also shows a third PC 62. That personal computer 62 is representative of a station, proximate a station initiating an emergency call, which can be the recipient of an indication of the emergency. This feedback can serve to effect a first, local emergency response.

The overall network 50 is on the other side of the interface 36. The local equipment is shown as communicating with the network 50 through the call processing component 48 of the interface 36 and the EMP 32.

The network 50, in turn, is shown as having a third database 59. This database 59 is an emergency system database integral with the call network 50. FIG. 3 also illustrates, in box form, a representation of the Internet 63 which can be accessed through the network 50.

FIG. 3 thus shows a voice system employing the EMP 32 in accordance with the present invention in one particular configuration. It illustrates a voice system which is based on a number of distributed elements, all of which have intelligence and are working together to comprise the overall voice system.

Figure 4:
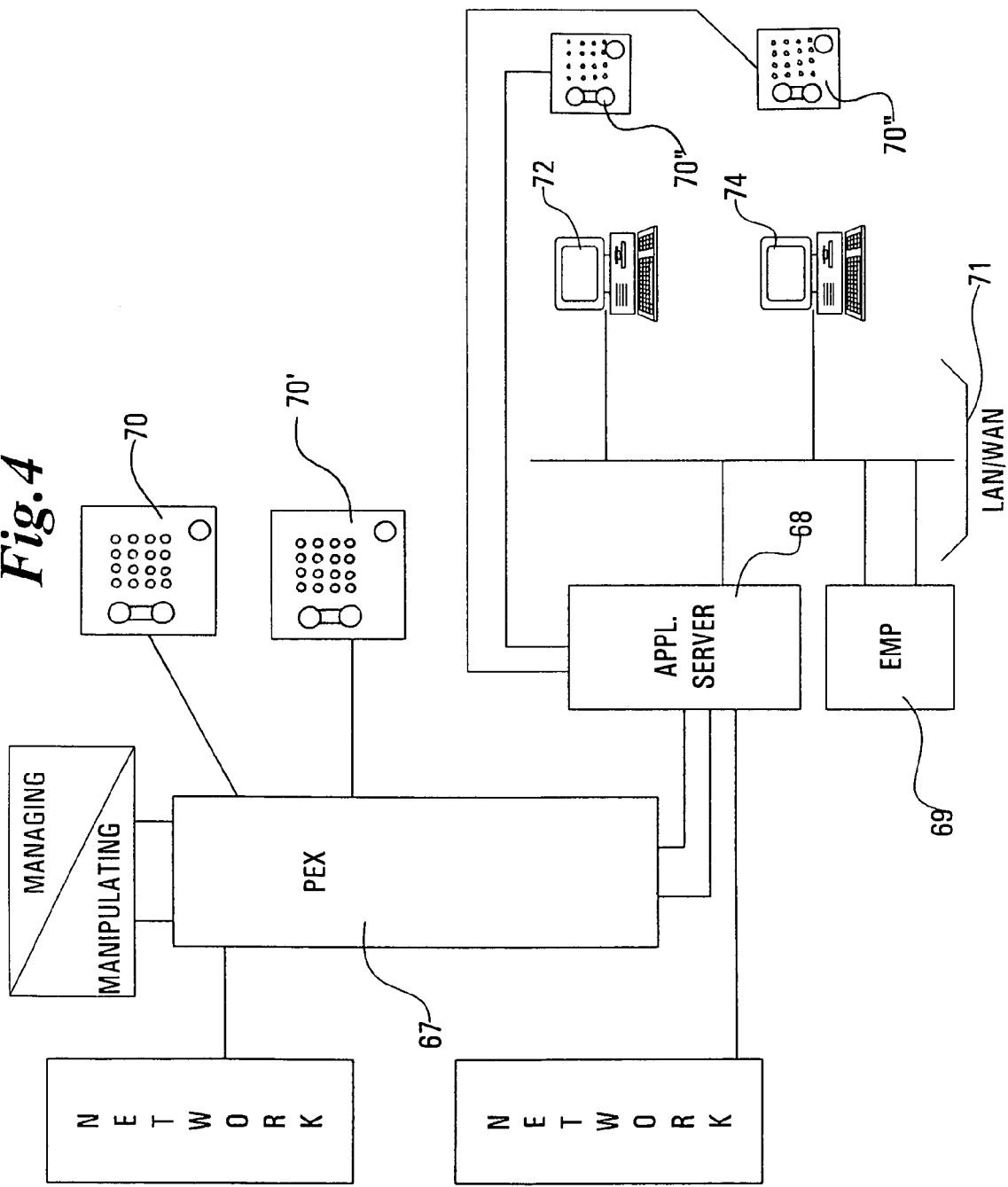
FIG. 4 is a block diagram of with the interconnection of an Application Server to a PBX with inputs Network A, EMP and telephones, to a Network B, and to PC's and telephones.

FIG. 4 illustrates a different application employing the present invention. FIG. 4 illustrates a traditional PBX 67, but it also employs elements of the type of distributed architecture illustrated in FIG. 3. FIG. 4 is thus a hybrid of old technology, or traditional PBX technology, integrated with a concept of computer telephony. That is, FIG. 4 illustrates an employment of the present EMP 64 in conjunction with the prior art system illustrated in FIG. 1. It employs an interface 66 which comprises the PBX 67, the application server 68, and the emergency message processor (EMP) 69. FIG. 4 illustrates telephone sets 70, 70', 70", 70''' and personal computers 72, 74 which connect with the interface 71 in a manner as discussed with respect to FIG. 3.

Figure 5:
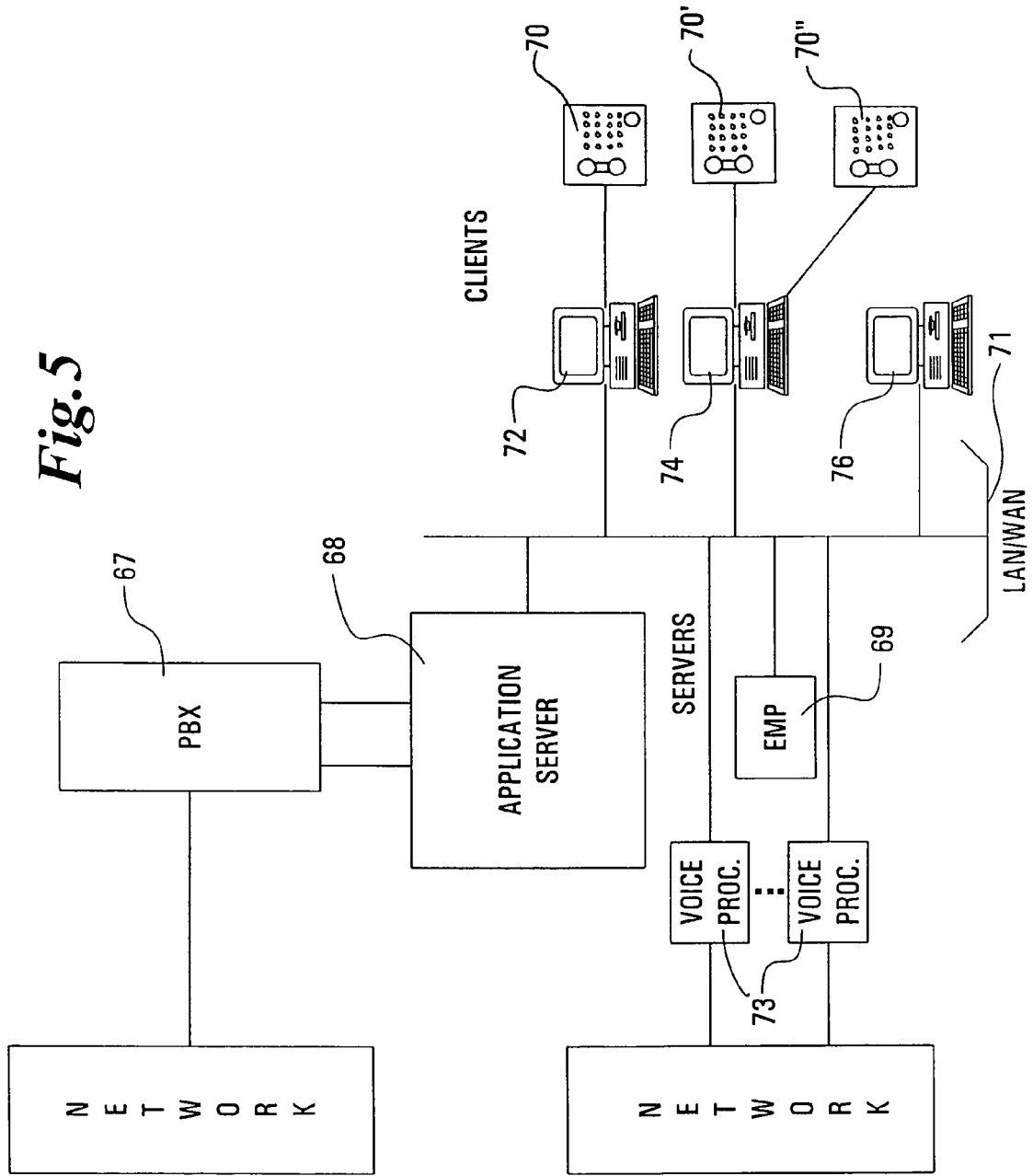
FIG. 5 is a block diagram of a higher level communication connection arrangement having interconnections of an Application Server to PBX connections to a Network A, to Voice Processors with a Network B input, to an EMP and to PC's with a telephone input.

FIG. 5 is another variation of a system employing an EMP 69 in accordance with the present invention. The difference between FIG. 5 and FIG. 4 is that FIG. 5 deals with a number of specific voice processors 73. Such voice processors 73 are, in essence, contained within the applications component of the interface. FIG. 5 also illustrates a third personal computer 76. This personal computer 76 can be used as an Internet connection.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

What is claimed is:

1. Emergency message processor apparatus, for use in a local communications network including supported multiple transmission sources, to provide emergency message initiator identification information, regarding the one transmission source having initiated an emergency message, to an emergency system including an emergency system (ALI) database, the apparatus comprising:

(a) an information storage unit, interposed in the local communications network, maintaining indicia, defining the multiple transmission sources, to be transmitted under emergency circumstances, and implementation information to enable the indicia to be transmitted and properly routed when emergency circumstances occur, immediately upon initiation of an emergency message; and (b) an initiator, in the local communications network, fully implementing transmission into the emergency system, with minimal volitional activity, of at least some of the indicia, defining a transmission source implementing transmission under emergency circumstances, immediately upon initiation of an emergency message;

(c) wherein said initiator precludes a need for any extraordinary adjunct equipment specially installed in the emergency system which corresponds with said initiator.

2. An emergency message processor apparatus in accordance with claim 1 wherein said processor interfaces with a PBX.

3. An emergency message processor apparatus in accordance with claim 2, said processor further comprising means for managing the PBX.

4. An emergency message processor apparatus in accordance with claim 3 further comprising means for manipulating said indicia.

5. An emergency message processor apparatus in accordance with claim 1 further comprising means for concurrently transmitting emergency message indicia to a monitoring location proximate a transmission source experiencing the emergency circumstance.

* * * * *